No. 699,804. Patented May 13, 1902.
J. F. MORIN.
BARREL COVER.
(Application filed Feb. 4, 1902.)
(No Model.)
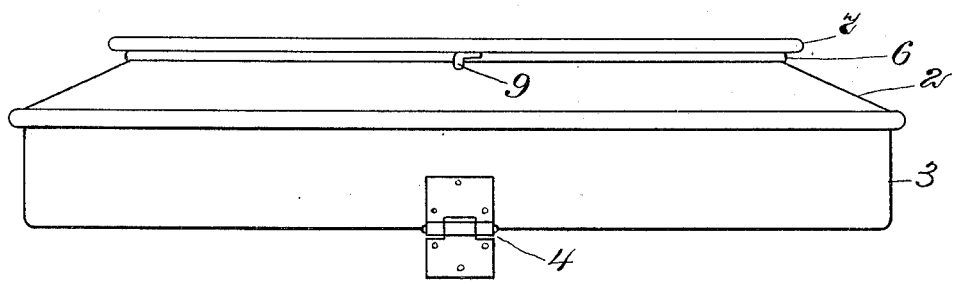
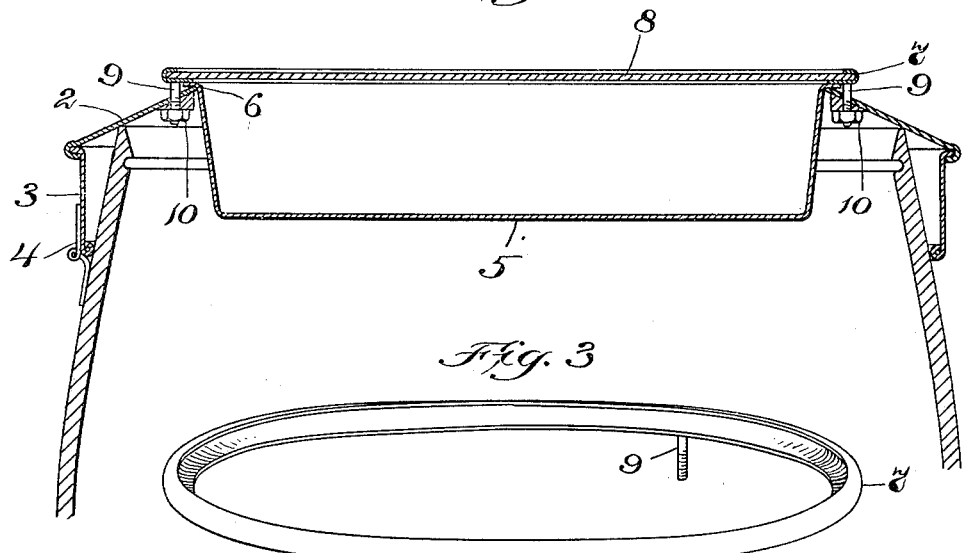
Witnesses:
A. D. Harrison
George Pezzetti
Inventor;
J. F. Morin
by Wright Brown & Quinby
Attys.
THE NORRIS PETERS CO., PHOTO-LITHO., WASHINGTON, D. C.

UNITED STATES PATENT OFFICE.

JOSEPH F. MORIN, OF LAWRENCE, MASSACHUSETTS.

BARREL-COVER.

SPECIFICATION forming part of Letters Patent No. 699,804, dated May 13, 1902.

Application filed February 4, 1902. Serial No. 92,508. (No model.)

*To all whom it may concern:*

Be it known that I, JOSEPH F. MORIN, of Lawrence, in the county of Essex and State of Massachusetts, have invented certain new and useful Improvements in Barrel-Covers, of which the following is a specification.

This invention relates to barrel-covers having provisions for holding and displaying a sample of the contents of the barrel, and has for its object to provide a neat, durable, and relatively inexpensive sample-holding cover adapted to be readily applied and removed from the upper end of a barrel and to give the barrel an attractive appearance.

The invention consists in the improvements which I will now proceed to describe and claim.

Of the accompanying drawings, forming a part of this specification, Figure 1 represents an edge view of a barrel-cover embodying my invention. Fig. 2 represents a sectional view of the same and of the upper end portion of a barrel to which the cover is applied. Fig. 3 represents a perspective view of the rim or frame which holds the sample-projecting pane or cover.

The same numerals of reference indicate the same parts in all the figures.

My improved sample-holding barrel-cover comprises an annular rest portion 2, which is preferably of frusto-conical form and is adapted to bear upon the upper end of a barrel, the outer margin of said portion projecting outside of the barrel, while the inner margin projects inside the barrel, as shown in Fig. 2; a rim portion 3 of cylindrical form, secured to and projecting downward from the outer margin of the rest portion 2 and adapted to be connected by means of a hinge 4 or otherwise with the body of the barrel, the lower end of the rim portion bearing against the body of the barrel and preventing edgewise displacement of the cover, and a pan portion 5, having at its upper end an outwardly-projecting flange 6, which is secured to the inner margin of the rim portion 2, the said pan portion extending downwardly from said inner margin and entering the upper end of the barrel. The rest portion, the rim portion, and the pan portion are preferably made in separate parts and suitably connected by means commonly practiced by sheet-metal workers, the flange 6 of the pan being preferably soldered to the inner margin of the rest portion 2, while the outer margin of the said rest portion is preferably joined to the upper edge of the rim portion, as shown in Fig. 2.

7 represents an annular metal rim or frame which is practically U-shaped in cross-section and is adapted to inclose the margin of a circular pane 8 of glass or other suitable transparent material, forming a cover for the pan. The frame 7 is seated upon the portion of the cover which surrounds the mouth of the pan and is detachably secured to the cover by suitable means, such as bolts 9 9, affixed to the frame and projecting downwardly through orifices formed in the rest portion 2, said bolts being screw-threaded and provided with nuts 10 10.

It will be seen that the parts 2, 3, and 5 constitute a cover which is formed to prevent access to the contents of the barrel and is adapted to contain and display a sample of said contents, the cover being readily displaceable to permit access to the interior of the barrel.

I claim—

A sample-holding barrel-cover comprising an annular rest portion formed to bear on the upper end of a barrel, a rim portion projecting downwardly from the outer margin of said rest, and formed to surround the upper end of the barrel, and a pan portion having a flange projecting over the inner margin of said rest and filling the space surrounded thereby, combined with an annular rim or frame seated on said flange and provided with means for detachable connection with the cover, and with a circular transparent pane covering this pan portion of the cover, the lower portion of the annular rim or frame extending between the pane and the flange of the pan portion.

In testimony whereof I have affixed my signature in presence of two witnesses.

JOSEPH F. MORIN.

Witnesses:
   JOHN P. MAHONEY,
   LEWIS H. SCHWARTZ.